Mar. 3, 1925.  
C. HAMANN  
1,528,018  
COMBINED TYPEWRITING AND COUNTING MACHINE  
Filed Jan. 17, 1921  14 Sheets-Sheet 1
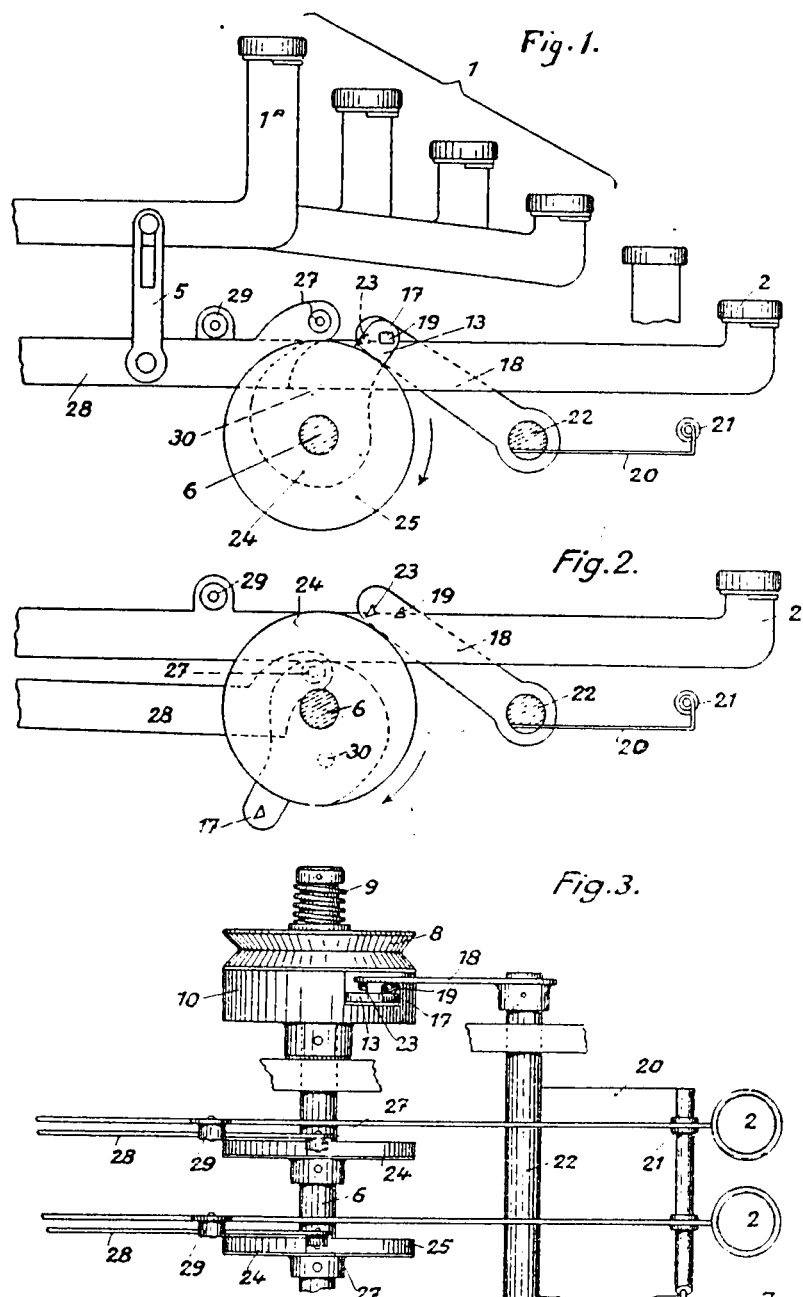

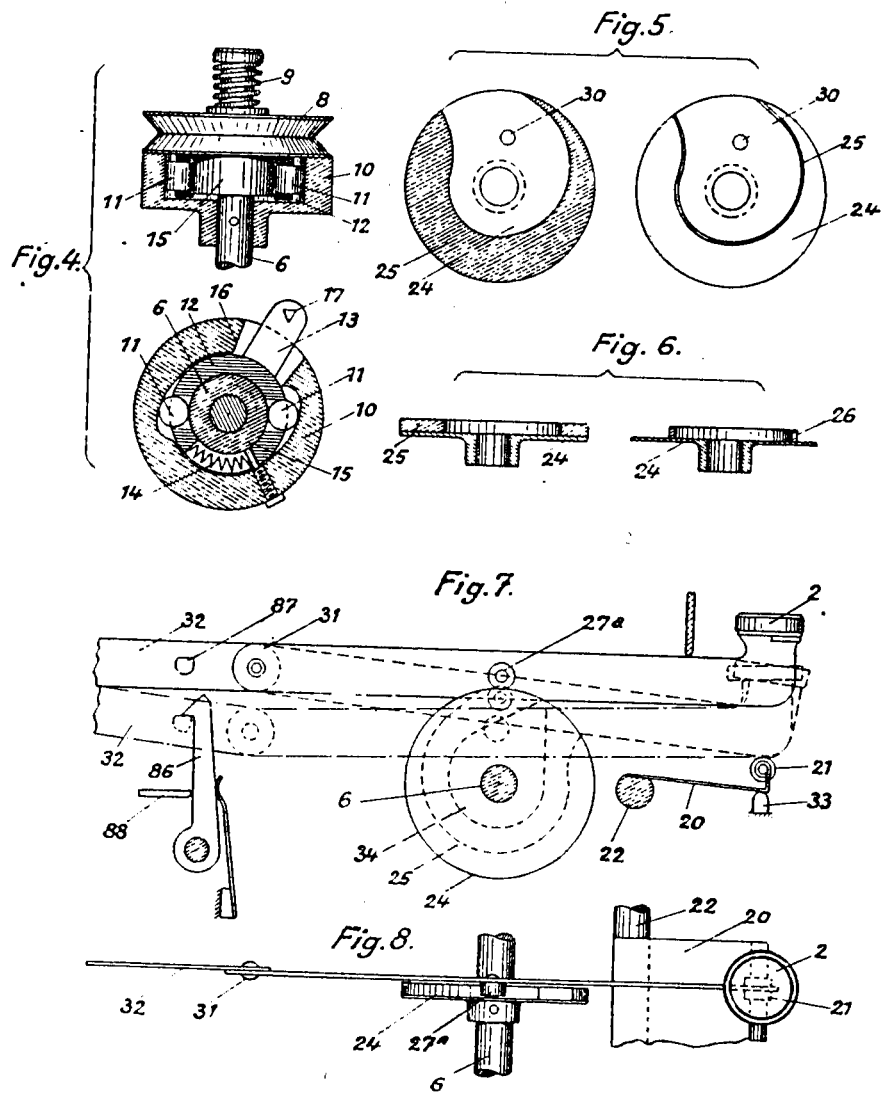

Mar. 3, 1925. 1,528,018
C. HAMANN
COMBINED TYPEWRITING AND COUNTING MACHINE
Filed Jan. 17, 1921 14 Sheets-Sheet 3

Inventor.
Christel Hamann.
By [signature]
Attys

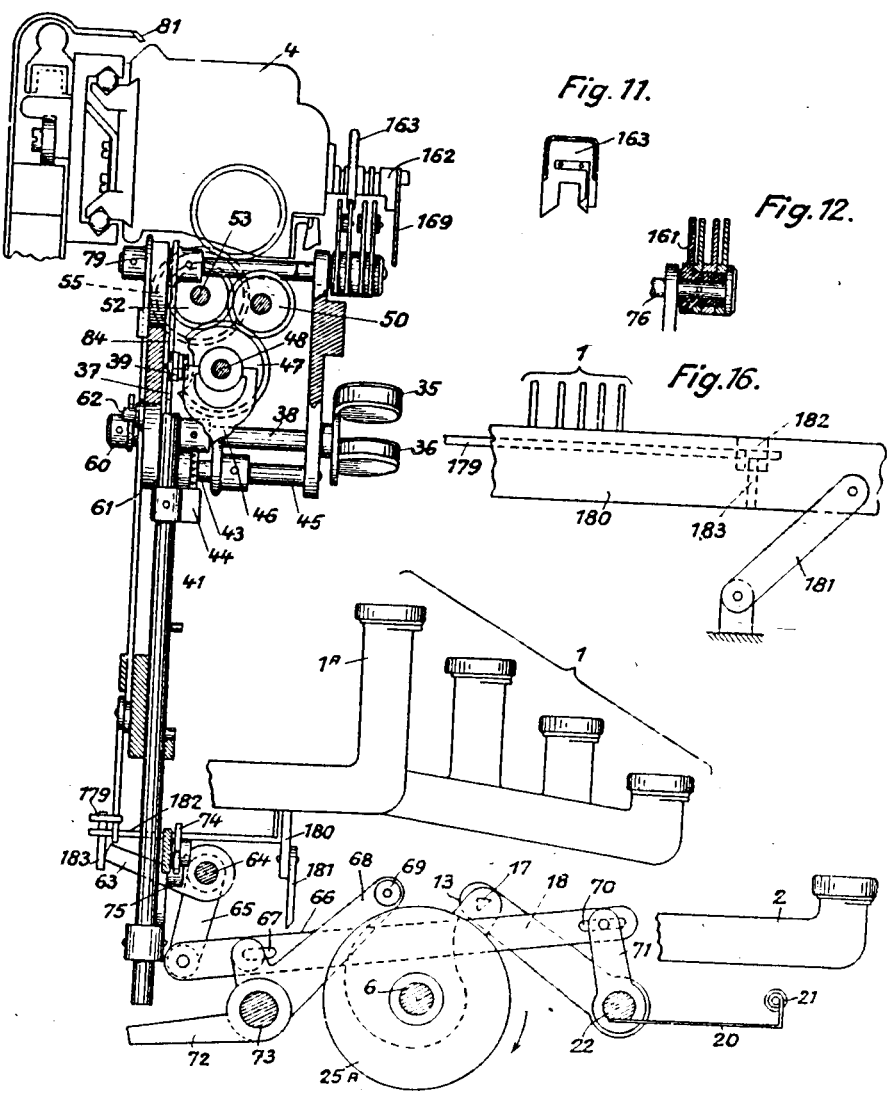

Mar. 3. 1925.
C. HAMANN
1,528,018
COMBINED TYPEWRITING AND COUNTING MACHINE
Filed Jan. 17, 1921     14 Sheets-Sheet 6
Fig. 13 $^a$
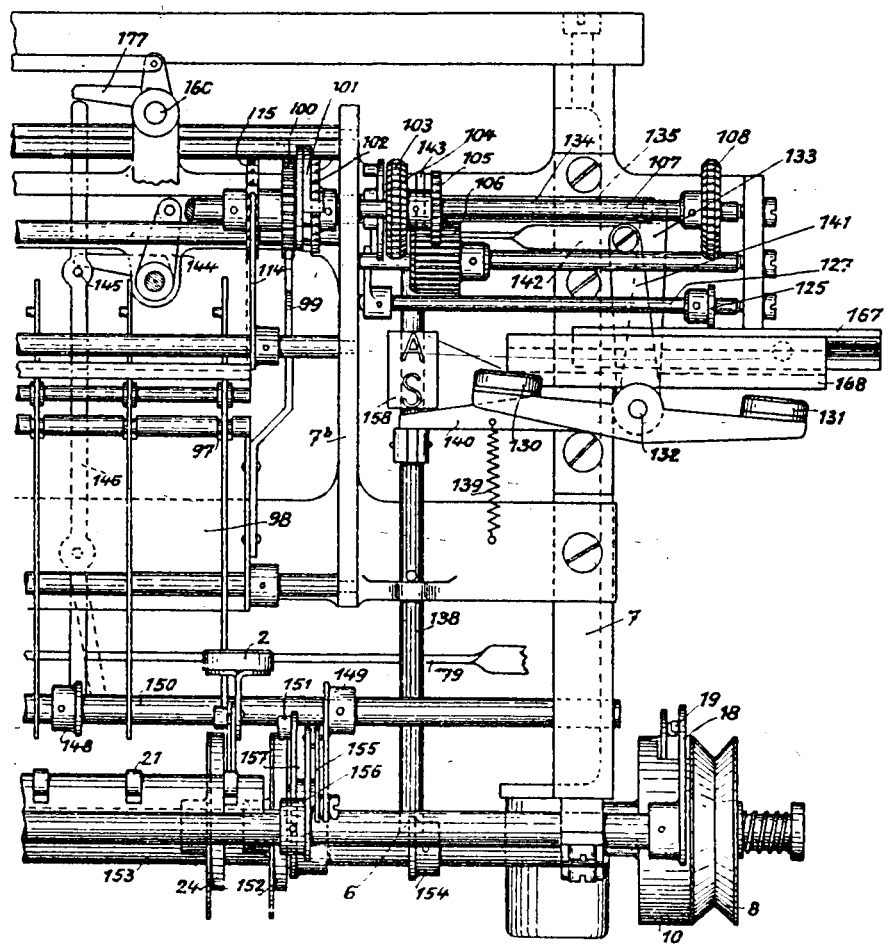
Inventor:
Christel Hamann
By Knight Bros.
Attys

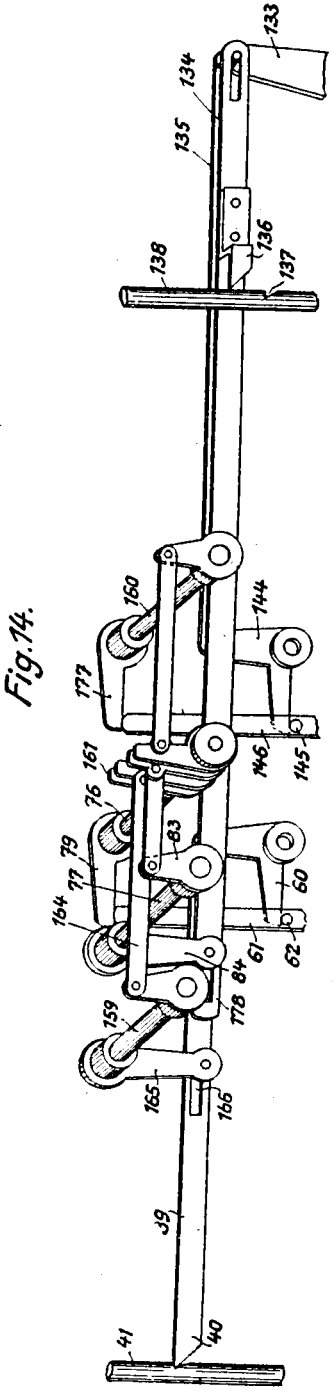

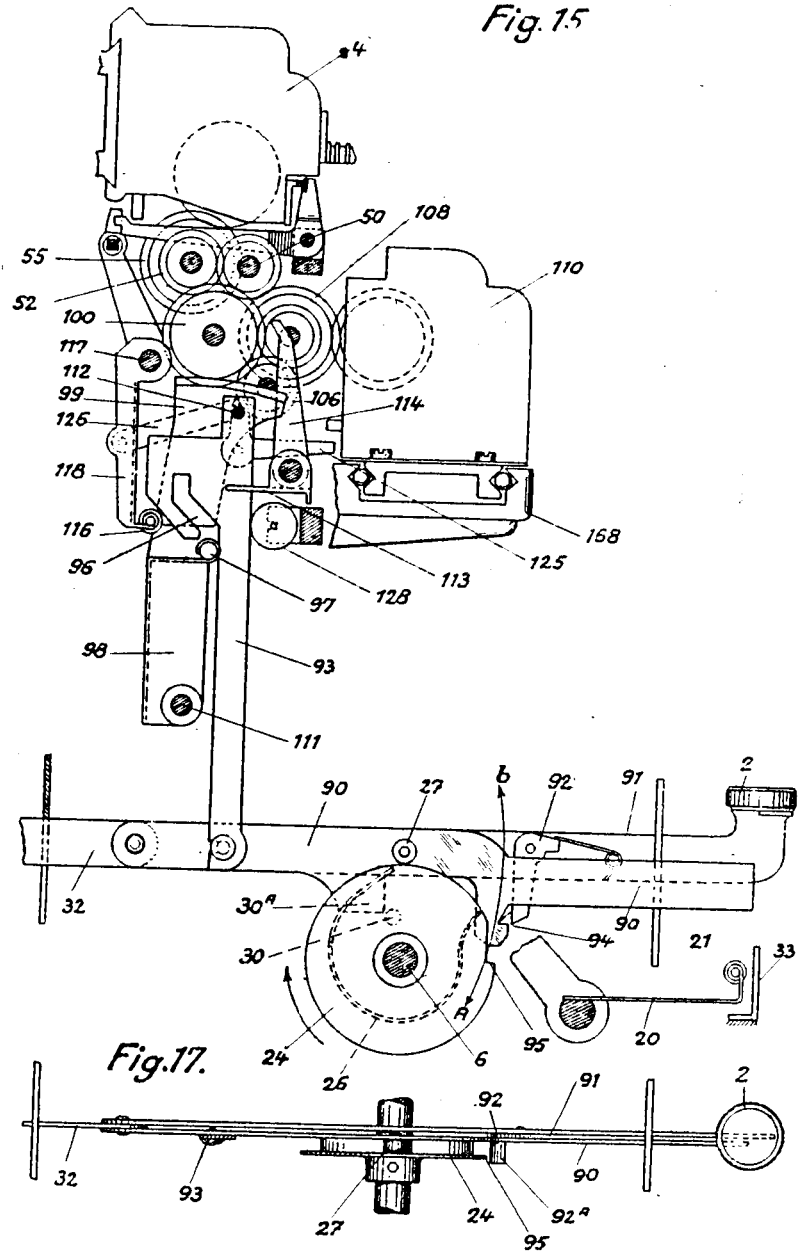

Mar. 3, 1925.

C. HAMANN 1,528,018

COMBINED TYPEWRITING AND COUNTING MACHINE

Filed Jan. 17, 1921 14 Sheets-Sheet 9

Inventor.
Christel Hamann
By [signature]
Attys

Mar. 3, 1925.  1,528,018
C. HAMANN
COMBINED TYPEWRITING AND COUNTING MACHINE
Filed Jan. 17, 1921   14 Sheets-Sheet 10
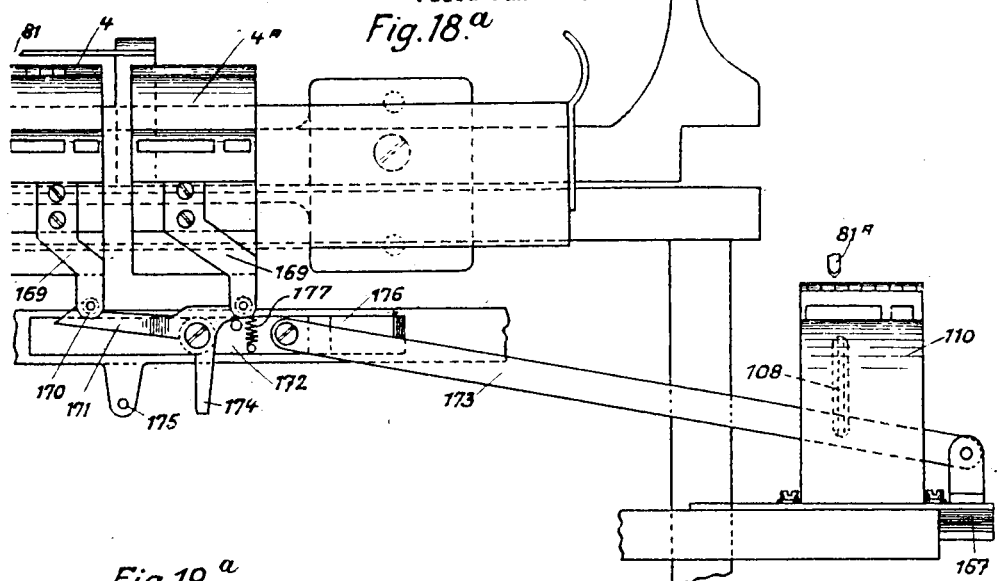
Fig. 18.ᵃ
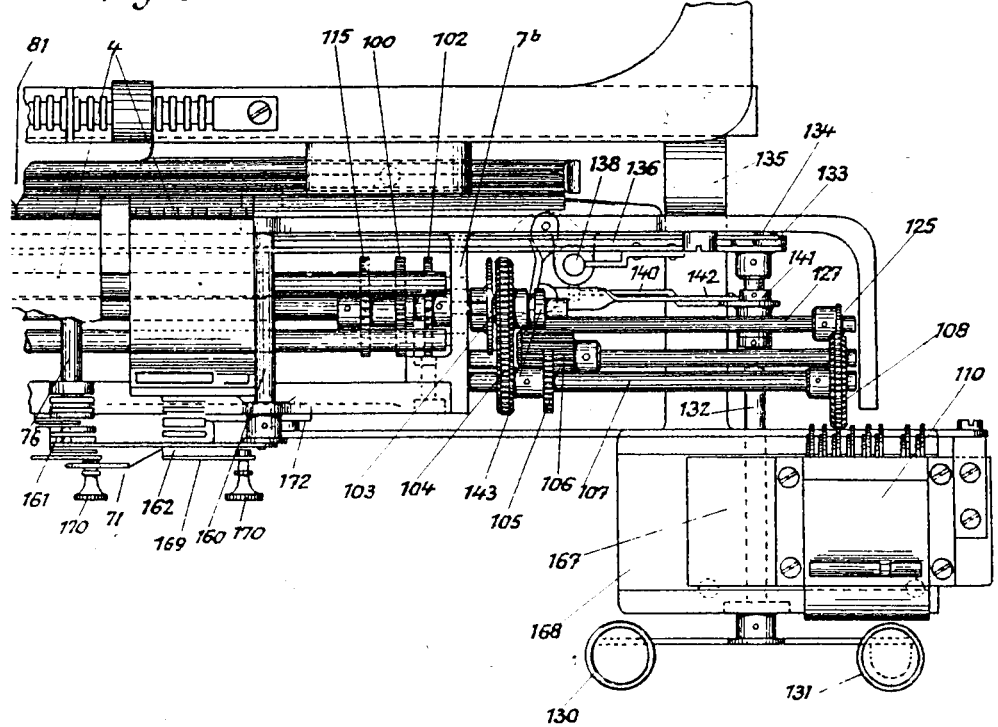
Fig. 19.ᵃ
Inventor:
Christel Hamann

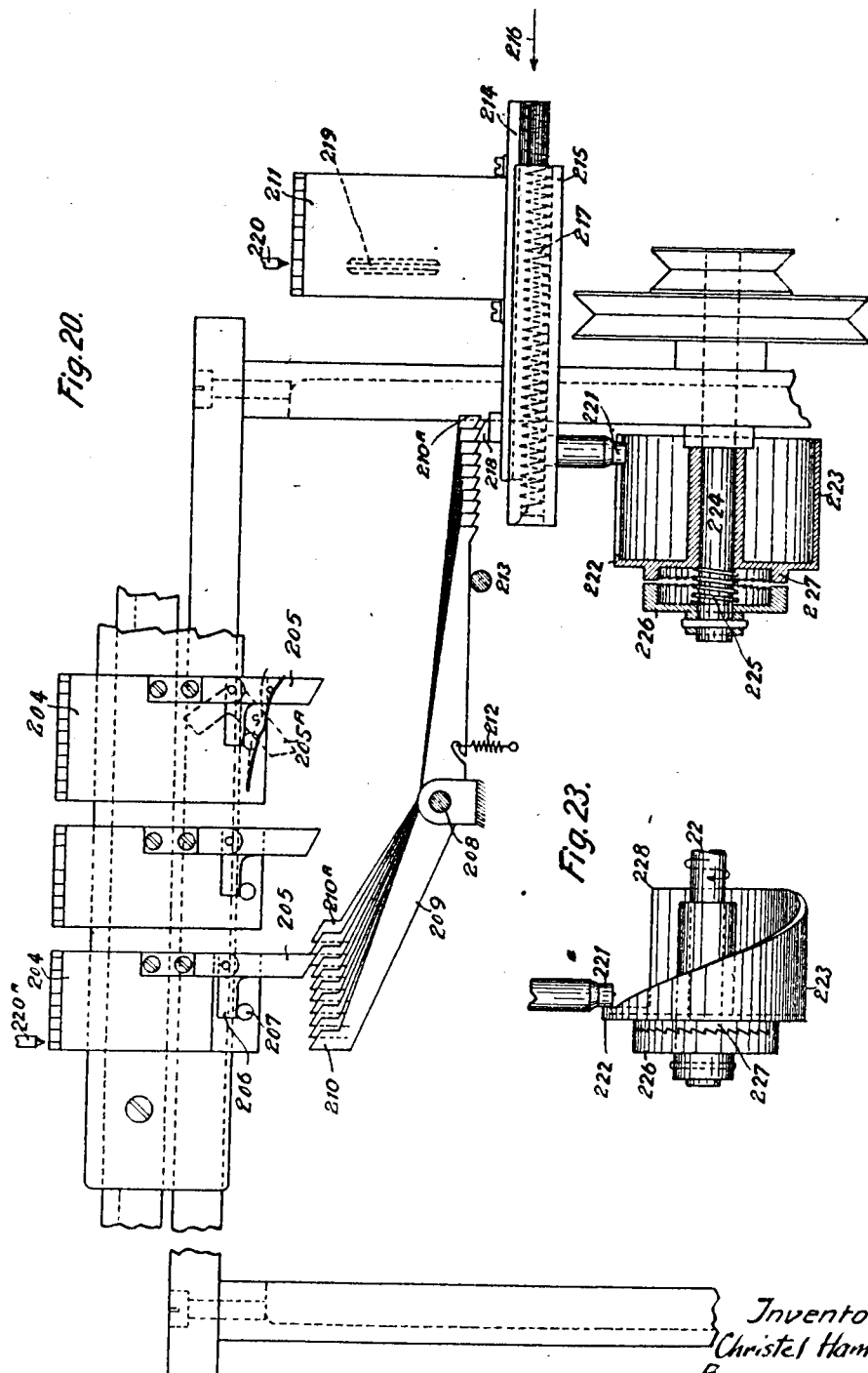

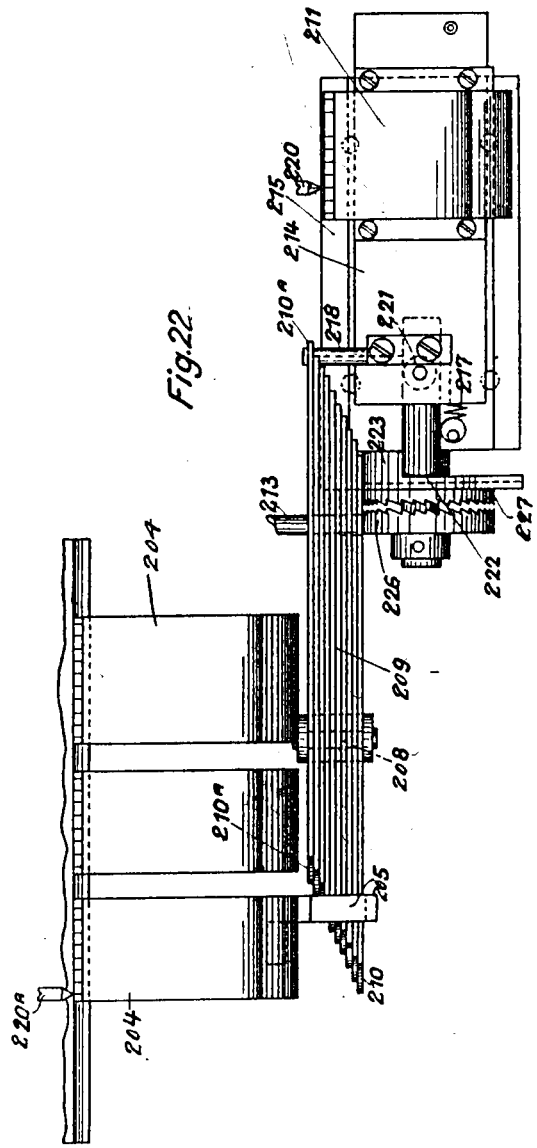

Patented Mar. 3, 1925.

1,528,018

UNITED STATES PATENT OFFICE.

CHRISTEL HAMANN, OF THURINGIA, GERMANY, ASSIGNOR TO MERCEDES BÜRO-MASCHINEN- UND WAFFENWERKE, OF POST MEHLIS, GERMANY.

COMBINED TYPEWRITING AND COUNTING MACHINE.

Application filed January 17, 1921. Serial No. 437,983.

(GRANTED UNDER THE PROVISIONS OF THE ACT OF MARCH 3, 1921, 41 STAT. L., 1313.)

*To all whom it may concern:*

Be it known that I, CHRISTEL HAMANN, a citizen of Germany, residing at Zella-Mehlis 2, Thuringia, Germany, have invented certain new and useful Improvements in Combined Typewriting and Counting Machines (for which an application has been filed in Germany February 16, 1918, Patent Number 321.834), of which the following is a specification.

The present invention relates to a typewriting and calculating machine with a motor-operated driving gear for the totalizers. The feature of the present invention consists in operating the numeral keys, the shift-key for capitals and small characters, the shift-key for addition and subtraction and the shift-key for changing the color of the ribbon and also an automatic change from one class of calculation to another, in such a manner from a source of power that the operating members will be accelerated, beginning immediately with the stroke of the key. It is the object of the present invention to give all keys of the keyboard an even, light stroke, and to automatically perform the shifting which must necessarily take place when a totalizer enters into a certain column from addition to subtraction, or vice versa, by means of the same source of power which operates the keys.

The present invention may be applied to the Underwood-Hanson, Remington or other suitable type of machine.

Typewriters have already been constructed, in which the key-levers are not operated directly by an operator's hand touching the keys, but by a special source of power, generally an electric motor. These typewriters work in such a manner that the respective type levers will, according to the type to be printed, receive a sudden impulse. Contrary hereto the computing mechanism of a typewriting computing machine require a slower drive, because the masses which have to be moved from idle position are greater than a mere type lever, and because, furthermore, the parts to be driven are more sensitive to sudden operation.

Driving gears for the computing devices in combination writing and computing machines have been disclosed which transmit by aid of motor power the values set up on the keys to the computing mechanism. These gears operate in such a manner that only the computing mechanism is operated by the source of power, and only moreover, when the keys have been previously set, whereupon the motor power immediately acts at its full speed. Such an operation may, however, lead to injuries to sensitive parts of the respective machine.

In the accompanying drawing:

Figs. 1 and 2 are side elevations,

Fig. 3 is a plan view of the driving gear.

Fig. 4 is a section through the clutch of the driving gear, both axially and transversely.

Fig. 5 is an elevation of two different driving members, which are in

Fig. 6 shown in section.

Figure 9:
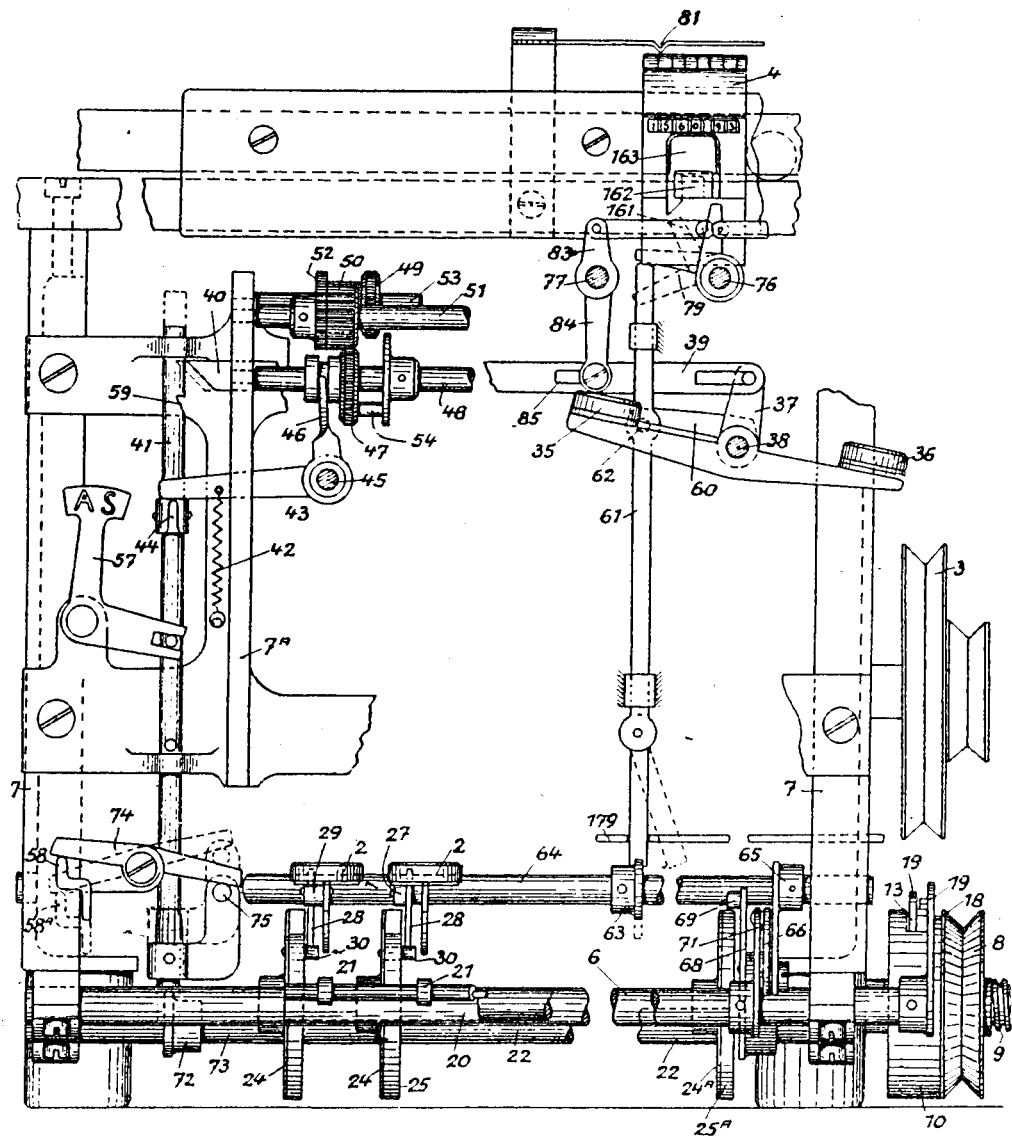
Figure 13:
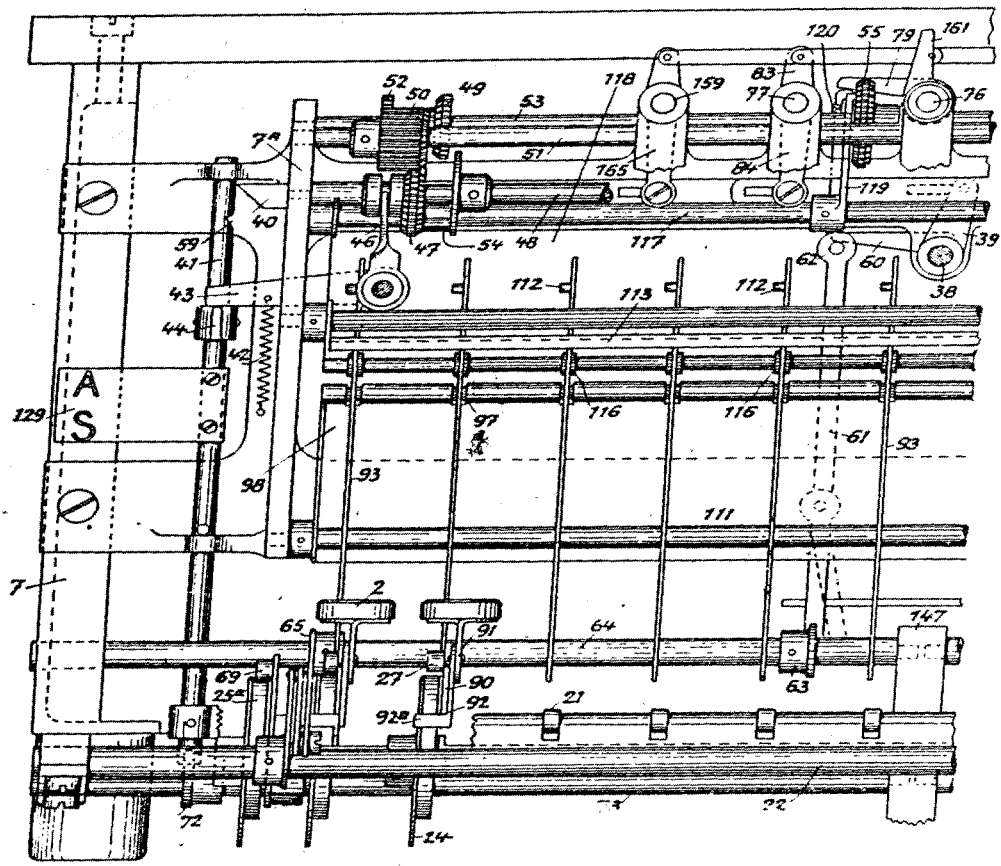

Fig. 7 is a modified form of the drive,

Fig. 8 is a plan view of the same,

Figs. 9, 13 and 13ª are front elevations of the machine, all such parts having been omitted, which are not necessary for explaining and describing the present invention.

Fig. 10 is a side elevation of Fig 9,

Figs. 11 and 12 are details.

Fig. 14 is a perspective view of the device for automatically shifting to a different class of calculation, Fig. 15 shows the transfer arrangement from a counting key to the totalizers.

Figure 18:
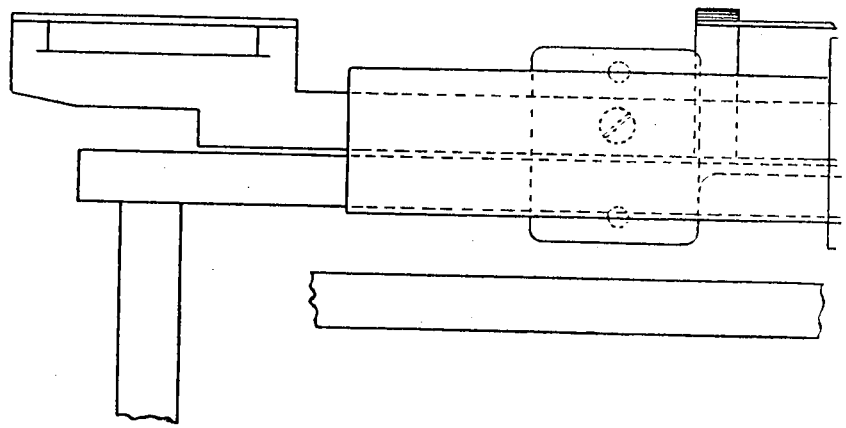

Fig. 16 is a detail,

Fig. 17 is a constructional form of a counting key,

Figs. 18 and 18ª show the relation between the vertical totalizer and the cross totalizer.

Figure 19:
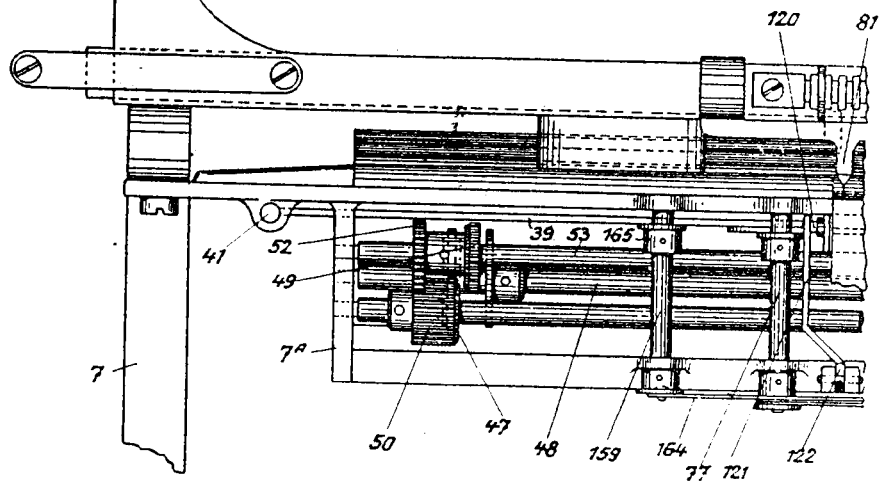
Figure 27:
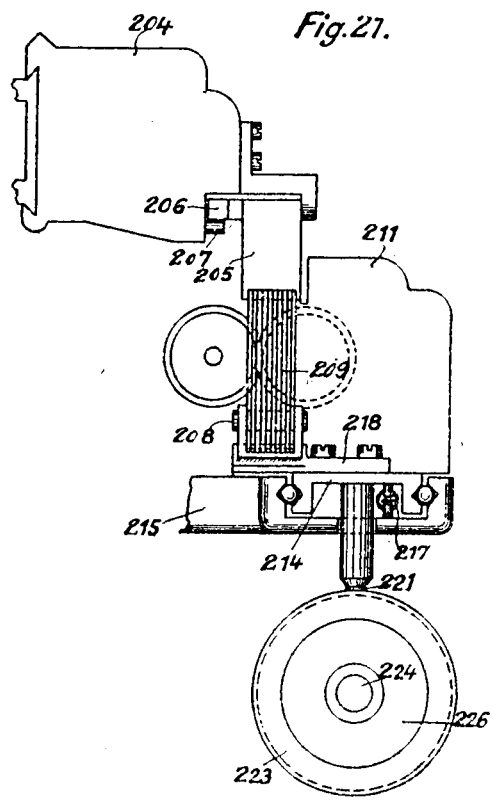

Figs. 19 and 19ª are plan views of the transfer device between a vertical totalizer and a cross totalizer.

Figure 24:
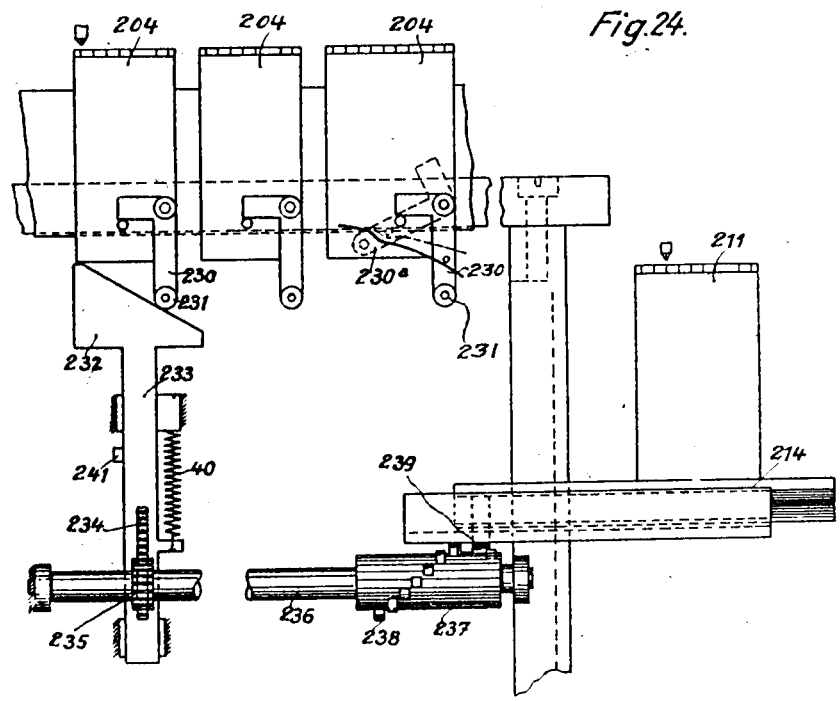

Figs. 20–24 illustrate a special controlling gear for the totalizers, namely,

Fig. 20 in front elevation,

Fig. 21 in side elevation,

Fig. 22 in top view,

Fig. 23 in detail,

Fig. 24 is a front elevation of another constructional form.

The series of keys 1, Figs. 1 and 10, is used for writing copy, including the characters and figures of the ordinary kind, the typelevers being in known manner operated by a motor connected through the belt pulley 3 (Fig. 9) which operates the driving gear. The row of keys 2 forms a separate set of numeral keys, from which is transmitted to the vertical totalizer 4 the figures to be added which have been set up on these keys. In order that the figures transmitted from the row of keys 2 to the totalizer may be printed, each key 2 is coupled by means of a link 5 (Fig. 1) to the respective typelever 1ª, so that the movements of the counting key 2 are transmitted to the typelever 1ª. Owing to the slot provided in the said link 5, however, the counting key 2 will not be operated when the writing key 1ª is operated, so that when figures are written in copy, they are not transmitted to the counting mechanism. If a calculation is to be made without typing the figures, the coupling between the pulley 3 and its shaft is disconnected, as the keys 1 will, as hereinbefore stated, give a print only when they are motor driven. The disconnecting of this coupling however does not fall within the scope of the present invention.

Transversely beneath the sets of keys 1 and 2 extends a shaft 6, which at its two ends is journalled in the body 7 of the machine. On the end at the right side, which extends through the bearing, is fitted a loose pulley 8, Figs. 3, 4 and 9, which is pressed by a spring 9 against the drum 10 which, together with the rollers 11, the guide ring 12, the arm 13 thereon and the spring 14, forms a locking gear of known design. The cylinder 15 forms one unit with the loose pulley 8, while the drum 10 is keyed to the shaft. When the pulley is turned clockwise, the friction produced between it and the drum 10 will cause the latter to be turned round until the wall 16 of the notch for the arm 13 bears against the said arm. The arm is withheld from further rotation by a stop 19 fitted to a rocking lever 18 bearing against the stop 17 on said arm 13 so that the shaft 6 is held in its normal position. When one of the keys 2 is depressed, its arm will immediately strike against the small roller 21 on plate 20 which extends beneath all the computing keys, a small roller 21 being provided for each key lever, and the plate itself being rotatable a certain distance with shaft 22. If, after the roller 21 has been reached by the key lever, the pressure on the key is continued, the lever 18 which is rigidly attached to said plate 20 will be rocked and the stop 19 will release the stop 17. Now the spring 14 in drum 10 can turn the guide ring 12, whereby the rollers 11 come to exert their locking action between the cylinder 15 and the bevels of drum 10, whereupon the latter and with it the shaft 6, participates in the rotation of the pulley 8. This coupling lasts, if the key has been given a short touch only, only until the stop 17 again strikes against stop 19, whereby spring 14 is again compressed and the rollers 11 enter into the flare of the bevels. If, on the other hand, the key is depressed longer, so that the plate 20 will be still in a slanting position, when the stop 17 approaches its initial position, the latter will strike against the stop 23, whereby the rotation is interrupted shortly before the normal position has been reached. After the pressure on the key has ceased the stop 17 will pass fully into its normal position by sliding off the stop 23 and meeting against the stop 19. Each depression of a key, therefore, however long it may last, will thus cause one rotation of the shaft 6.

On the shaft 6 is fitted for each key 2 a disc 24, on the one side of which is either a cam-shaped ring 25 or a bent strip 26 (Figs. 5 and 6). The mouths of these sickle shaped cams (Fig. 3) are opposite to rollers 27, which are each singly fitted to an extension of lever 28, which is disposed parallel to the keylever 2. A roller 29, fitted to the key lever 2 engages over the lever 28, so that when the lever 2 is depressed, the lever 28 will also be depressed. The distance between the key lever 2 and the roller 21 on the plate 20 is so measured that the roller 27 of the lever 28 will enter into the cavity of the cam 25 when the roller 21 is struck. After the clutch between the pulley 8 and the shaft 6 has been engaged by a further depression of the key 2, the roller 27 will be lying deep enough in the cavity of the cam so that when the shaft 6 is now revolved and therewith also the discs 24, the roller 27 will be moved towards the shaft 6 by the gradual rise of the cam 25. The lever 28 thereby receives the position shown in Fig. 2. Since the roller 29 of type lever 2 bears on the upper side of the lever 28 only, the type lever is not moved downward with the lever 28. After the roller 27 has reached its lowest position, the pin 30 in disc 24 will meet the curved end of lever 28 and move it up again into its initial position. It is therefore obvious that both the upward and the downward strokes of the lever 28 are positive. To each lever 28 is coupled an intermediate gear, to be hereinafter more particularly described, which transfers the values 1 to 9 from the keys 2 to the counting mechanism. For obviating the use of such intermediate gear the incline of the cams on the nine discs may form different phases, so that that of the 1-key has less steep gradient than that of the 2-key, etc., the respective oscillations of the nine levers 28 thereby corresponding to the value of the respective keys.

Fig. 7 illustrates a modification of the arrangement hereinbefore described, this modified arrangement being especially designed for use with the case-shift key. Here the key lever 2 is provided with a joint 31, by means of which it is coupled with the lever 32, the lever 2 being pivoted on said joint and rocking thereon when the key is depressed and brought into the position shown by dotted lines. The roller 27ª has now entered into the mouth of the cam and the plate 20 has caused the rotation of the disc 24 in the manner hereinbefore described. When the latter approaches its initial position, the lever 2 and the lever 32 will have assumed the positions shown by dot and dash lines, for the reason that when the dotted position of lever 2 is reached, the plate 20 strikes against the stationary ledge 33 attached to the machine body so that when the roller 27ª is drawn towards the shaft 6, the lever 2 cannot yield downwardly at its key end, but only at its jointed end. The cam 25 with its core 34 here forms a guide which positively controls the upward and downward stroke of the lever 2.

The positive upward stroke of the keys 2 will result in a stroke against the operating fingers, if these have not immediately been removed after each depression. For avoiding this a provision is made as shown in Figs. 13 and 13ª, 15 and 17. To the lever 32 are linked the levers 90 and 91, which lie beside each other so that they can move freely and independently. The lever 91 carries the key 2 and the pawl 92 under action of a spring. To the lever 90 is fitted a roller 27 and the transmitting attachment 93. When, now, the key 2 is depressed, the movement of lever 91 is transmitted to the lever 90 by means of the pawl 92 which enters into a notch 94 in a projection of the lever 90 whereby the two levers are coupled for their downward stroke. When the key 2 is depressed, the two levers will therefore rock on the pivot of lever 32 so that the point of the pawl 92 engaging in the notch 94 moves in the arc a—b, whereby its prismatic projection 92ª engages a notch 95 in the disc 24. The key 2 has now reached its lowest position and bears against the stationary abutment 33. Meanwhile the lever 90 has met the roller 21 and has tilted the plate 20, so that the clutch 8, 10 (Fig. 3) is in engagement and the disc 24 is rotated. After the latter has turned through a small angle the notch 95, verging into the periphery of the disc, will force the pawl 92 out of the notch 94, so that the coupling between the two levers is disconnected and remains thus disconnected during the while rotation of the disc 24, since the periphery of the same on which the prismatic projection 92ª rides, does not allow of the pawl entering into the notch 94. When the key 2 is depressed, the roller 27 enters into the cam-groove 26 and when the clutch is engaged the lever 90 bears on the roller 21, and the plate 20 on the abutment 33, so that the rocking movement of the lever 90 is limited at its right end. When the disc 24 is rotated, the roller 27 is moved in a radial direction towards the axis 6. Since however, the right end of the lever 90 can no more yield, its left end swings downward and this motion is connected to operate the positioning of the totalizers. Herein the operation of lever 90 is identical with that shown in Fig. 7. When the disc 24 is approaching its initial position, the pin 30 strikes against the projection 30ª and forces the lever 90 upwards, but not the lever 91, since the pawl 92 is no more in engagement. A key 2 may thus be held depressed independently of the duration of the rotation of the disc 24. When both levers 90 and 91 have again assumed their initial position, the coupling between them will again be effected by the pawl 92.

By the arrangement just described a light and regular touch of the counting keys 2 is secured, and it is insured that a key, once it has been depressed will with certainty transfer its respective value to the totalizers.

The travel of the key is composed of two phases; a preparatory phase and an operative phase. The preparatory phase consists of the first, short stroke of the key, which moves a roller 27, or 27ª into the mouth of the cam and, at the same time, releases the arm 13 for coupling by tilting the lever 18. The first phase is produced by the key 2 being depressed by a finger. Also in some instances, automatically by the machine, when, for example, the gear is to be shifted from addition to subtraction, or vice versa, as shall be hereinafter described. The operative phase is performed exclusively by motor power, which, by rotating shaft 6 operates the totalizers, the printing members, the switching of the totalizers and effects changes of the ribbon, etc.

As hereinbefore stated, the oscillations of the levers 28 (Fig. 1-3) or 32 Figs. 7, 15, 17) respectively, are transmitted by a link 93 (Fig. 13, 13ª, 15) to the counting mechanism. This link is in the shape of a bar (Fig. 15) which is guided by a roller 128, and which is spread at its upper end to form a plate, in which a guide slot 96 is cut. A separate transmitting member of this kind is provided for each of the nine counting keys, thus also for each lever 90, and according to the nine values of the said keys the guide slots 96 are made with different gradients. The one shown in the drawing corresponds to the value "9," the other eight transmitters behind the one shown have such guide slots with gradually decreasing gradients. When one of the transmitters moves downwards, its guide slot engages over the bar 97, which is common to all transmitters. This bar 97 which is fitted at the free ends of the box-shaped part 98 in a scroll of the same will oscillate the said part 98 more or less with reference to the key depressed. Owing to the different gradients of the guide slots 96 equal lengths of stroke of the key will produce different angular tilts of the part 98. A toothed segment 99 riveted to the side of said part transmits the oscillation of the said part, corresponding to the value of the key depressed, to a gear 100, with which it is permanently in mesh (see also Figs. 13 and 19).

By a single-acting pawl 101 only the downward stroke of the keys 2 is transmitted by means of the ratchet wheel 102 to the main shaft 48, from which through the reversing gears 47, 49, 50, 52 and 103–106 by means of shafts 53 or 107 and gear 55 or 108, respectively, the vertical totalizer 4 and the cross totalizer 110 are operated.

All gears, ratchets and like devices which are employed for transmitting the values from the keys to the totalizers are disposed within a casing, which is attached by means of four supports to the body of the machine. In the side walls 7ª and 7ᵇ, which form a box, the gear and the tilting shafts are journalled, including the shaft 111, on which the part 98 rocks.

For taking up the inertia of the part 98 and also for securing that the incline of a cam 25 need not correspond exactly to the length of the incline of a guide slot 96, and may exceed the latter more or less, each of these guide slots terminates with a dwell so that the link 93 guided in a fixed path will prevent the latter and with it the part 98 from oscillating any further when its inclined slot has passed over the bar 97. Since however, the single acting ratchet gear 101 will still allow of the shaft 48 rocking, the same will be arrested by a pin 112 striking against a member 113 and tilting the same after the part 98 has rocked, so that the lever 114 rigidly attached to the said member 113, will engage in the teeth of the ratchet gear 115 and prevent the same from turning. The bar 113 has the form of a rake, so that the transmitters 93 are guided by the teeth.

For the same reason that a light touch of the writing and counting keys is desirable, an easy manipulation of the shifting over gear for the counting mechanism from addition to subtraction and vice versa is of importance, so much the more as these in many instances must be operated automatically by the vertical totalizer entering into a column of the opposite character. The reversing by hand is effected by means of the keys 35 and 36 (Fig. 9 and 10).

For making an addition, the key 36 is depressed, i. e., it is brought into the position shown, whereby the lever 37, which is rigidly fitted to the shaft, will draw the bar 39 to the right. At its left end the said bar 39 forms a latch 40, which in subtraction position, engages in the notch 59 in the bar 41. The bar 41 can, in consequence thereof follow the pull of spring 42, which, with its one end is hooked into the lever 43 and this with its free end bears on the projection 44 of bar 41. By means of shaft 45 the lever 43 forms a rigid toggle-lever with the fork 46, which engages the groove in the gear 47 and shifts the later on shaft 48 and over the dog 54, thereby disengaging it from mesh with the gear 49 into mesh with gear 50, which is rigidly fitted to shaft 51. On shaft 53 is fitted in addition to the gear 49 a gear 52. The latter is permanently in mesh with gear 50. These gears thus form a reversing gear train, so that when the driving wheel 47 meshes alternately with the intermediate gear 50 and the main gear 49 respectively, the driving shaft 53 will be reversed. The operation of the keys 2 acts on the shaft 48; by the reversing gear the motion is transmitted to the shaft 53, and thence by the gear wheel 55 to the gear wheel 56 of the vertical totalizer to add or subtract according to the position of the mechanism. At the position shown, the vertical totalizer will add, this being indicated by the signal 57 (Fig. 9) or 129 (Fig. 13) respectively, the operation of which is clearly apparent from the drawing.

The operation of the shift key 36 for addition necessitates a very small amount of power, because all that is necessary is to draw the latch 40 from the notch 59, the further work being performed by the spring 42. The operation of the subtraction key 35, however, requires more power, since besides the tightening of spring 42 the ribbon must also be reversed. The operation is performed as follows: When the subtraction key 35 is depressed, the lever 60 fitted to shaft 38 will rock. This lever rests on the pin 62 fitted in bar 61 and presses the said bar downwards. This latter bears with its lower end on the lever 63 pivoted on the shaft 64. At its right end a lever 65 is fitted to shaft 64, said lever 65 being coupled to the connecting rod 66 which acts with the left end of the slot 67 on the shorter arm of the bell-crank lever 68, so that the roller 69 on its longer arm is moved into the cam 25ª which, in the same manner as the nine cams of the counting keys is fitted by means of a disc 24ª to the same shaft 6 Figs. 9 and 10. When the roller 69 has entered far enough into the cavity of the cam so that it can be engaged, the left abutment end of the slot 70 in the connecting rod 66 has rocked the lever 71 rigidly fitted to shaft 22, and with it also the lever 18, which releases the projection 17 of the clutch. The shaft 6 can now revolve, whereby the roller 69 is moved radially towards shaft 6, the lever 72, which together with lever 68 is rigidly fitted to shaft 73, being swung upwards, so that the above mentioned bar 41 is displaced, which, tightening the spring 42, actuates the reversing gear by means of lever 45 and fork 46, and shifts it to subtraction position, whereupon the latch 40 secures it in this position. At the same time the signal 57 or 129 respectively, is thrown over to "S" for indicating the character of the calculation. In order that, when a key 2 is depressed, the roller 69, in addition to the roller 27, shall not be brought within the range of its respective cam, the slot 70 in the connecting rod 56 is extended to the right beyond the joint pin of lever 71, so that a rocking of plate 20 and of the lever 71 coupled thereto will remain without influence on lever 68. In order that the lever 68 may be freely operated by the cam 25ª, the slot 67 is provided. The extent of the slot 70 towards the left is such that the lever 71 will commence its oscillations only after the roller 69 has passed into the range of the cam.

The reversing gear for the cross totalizer 110 acts in the same manner as described for the vertical totalizer mechanism, and is operated by the keys 130, 131, Figs. 13, 13ª, 14 and 19. These are attached to a lever with arms of equal length, which is rigidly fitted to shaft 132 on which is likewise rigidly fitted a lever 133, to which the two bars 134 and 135 are linked. To the bar 134 is fitted the latch 136, which, by a pressure on key 131 is withdrawn from the notch 137 in bar 138, whereupon it will move downward under action of spring 139, which is hooked into lever 140. As, in consequence thereof, the lever 140, which with the lever 141 forms a toggle, also moves downward, the lever 141 will swing to the left and by aid of bar 142 and fork 143, which grips the boss of the change wheel 103, movable on shaft 48, will shift the same from its mesh with wheel 106 into mesh with wheel 104, so that the wheel 108 will revolve in adding sense. When the key 130 is depressed, the lever 133 forces the bar 135 to the left and thereby swings out the toggle 144, which by means of pin 145. Fig. 14, presses the bar 146 downwards so that the operation, performed in throwing over the counting mechanism 4 is repeated. Figs. 9 and 10 show the reversing gear for the vertical totalizers while Figs. 13, 13ª, 14 and 19 show the reversing gear for the cross totalizer 110. The latter is made independent of the former by the fact that the shaft 64 is composed of two halves, 64 and 150, which at their outer ends are journalled in the machine body 7, and at their inner ends in the bearing 147, and that for each half a lever 63 and 148, and 65 and 149 respectively is provided. Also the gears in connection with the lever 65, including the cam disc 25ª, which are fitted on the left half of the shaft, Figs. 13, 13ª, are repeated on the right side 150. When, now, the bar 145 presses the lever 148 downwards, the roller 151 fitted to lever 157 will by means of lever 149 and the connecting rod 155 be moved into the cam disc 152, and by means of lever 156 the shaft 22 with the lever 18 will be rocked so that the projection 19 will release the clutch. Just as the movements of the shaft 150 are independent of those of shaft 64, also the shaft 153 must be separated from the shaft 73, so that the rollers 65 and 149 can operate independently. The individualization is obtained by the bearing 147 which also receives the inner ends of the shafts 64, 150.

After the roller 151 has reached the range of the cam disc 152, and the latter revolves, the clutch 8, 10, having been released, the lever 154 which performs the same work as lever 72 in Fig. 10, will force the bar 138 upwards until the latch 136 (Fig. 14) engages in the notch 137, whereby the lever 141 Fig. 13ª, of the toggle 140, 141 swings to the right and by means of bar 142 fork 143 and shift wheel 103 changes the gear wheel 108 to a subtraction movement. The indicator 158 will now show the character of the calculation by an "S".

For more clearly indicating the positive and negative items in typing it is preferable that the respective figures are printed in different colors, for which purpose it is the custom to change the color of the ribbon. In order that this need not in each instance be performed by hand, the following device is provided which cooperates with the mechanism hereinbefore described and in fact, is operated by the same. When an addition is being made, the ribbon will for example, give a black print, in which case the key lever 58, Fig. 9 which is generally employed for changing the color of the ribbon, is in the position shown. When it is moved downwards contrary to the action of its spring into the position shown by dotted lines 58ª the ribbon will print say, in red. This switching over from position 58 to position 58ª is performed by the double-armed lever 74, which, pivoted to a stationary part of the machine, bears with its one arm on the shift lever 58, and with its other arm on the pin 75 in a projection on bar 41. When, now, by depressing the subtraction key, the bar 41 is positively shifted in the manner hereinbefore described, the ribbon shifting lever is pressed down into the position 58ª and held there until the latch 40 engages in the notch 59 of bar 41. When the said bar 41 is again released, as hereinbefore stated is the case, when the machine is set for addition, the lever 58 will move upwards again under action of its spring. The force required therefore is very small as the latch 40 has merely to be withdrawn from the notch 59. The greater force which is required in pressing down the ribbon shift key 58 is supplied in switching to subtraction by means of the power driven shaft.

The carriage of a typewriting computing machine is equipped in known manner with several vertical totalizers 4, Figs. 18, 18ª, which frequently must be switched to addition or subtraction according to whether they are entering into a positive or negative column. To the body of the machine is fitted a so-called cross totalizer 110, which is intended to receive the values transmitted to the vertical totalizers being partly positive, partly negative. In order, now, that it should not be necessary to perform the shifting operations of the respective vertical totalizers and the cross totalizers by hand each time the index changes, it is necessary that these shiftings be automatically performed according to a previous arrangement. According to the present invention these preparations for the shifting of a vertical totalizer are performed both for the cross totalizer and the vertical totalizer by setting the vertical totalizer in such a manner that on entering into its working column, it will not only initiate the shifting for itself but also for the cross totalizer. This shifting is performed by the same means which are employed for assisting the operation by hand. For the automatic operation only four shafts 76, 77, 159 and 160 with their respective levers and bars are added. Figs. 9, 13, 13ª, 14, 19 and 19ª. On shaft 76, Fig. 12, is fitted a lever 161 having an extended boss, and on this boss are fitted loose three further levers, resembling the lever 161, which by means of connecting rods transmit their movement to levers which are rigidly fitted to the shafts 159, 77 and 160, Fig. 14. According to the distance between the single levers of the set of levers 161, a block 162, Figs. 9 and 10 on the vertical totalizers, is provided with slits, into which riders 163, Fig. 11, may be inserted, the one fork of which is extended and bevelled off. The four slits in the block 162 are in the same plane as the four levers 161 so that when the carriage is moved, and with it a vertical totalizer the tine of the fork of a rider will strike one of the lever series 161 and move the same aside. If the lever marked 161 is struck, the shaft 76 will swing the horizontal lever 79 downwards and effect the shifting of the wheel 47 in the manner hereinbefore described whereby the vertical totalizer effecting this shifting will be driven by the wheel 55 in a subtracting sense. The indicator is standing on "S" and the ribbon is shifted to print red. If, now, the next vertical totalizer is to add, a rider is inserted into the second slit, as shown in Fig. 10. When the vertical totalizer enters into the counting column, the second lever of the group 161 will be rocked, and by means of the connecting rod 164 and the shaft 159 it will move the lever 165 to the right, which bears with a pin against the end of the slot 166 and draws the latch 40 from the notch in bar 41, so that the wheel 47 is shifted to allow the wheel 55 to revolve in an adding sense. The indicator now stands at "A" and the ribbon is set to print black.

The block 162 is fitted in such a manner to a vertical totalizer that when the highest value of the same enters into the counting column, which is visible from the outside by the graduation provided on each mechanism and by the pointer 81 fitted to the machine body, a rider has tilted one of the levers 161.

The cross totalizer 110 is fitted to a carriage which is guided with balls in a bracket 168 (Fig. 15) attached to the machine body 7 in the same direction as the typewriter carriage travels. When a value to be transmitted to the vertical totalizer, which has entered into the counting column, is also to be taken up by the cross totalizer 110, the latter will, in known manner, periodically participate in the movements of the vertical totalizer until all points of the said vertical totalizer have passed through the counting column, whereupon the cross totalizer again returns, likewise in known manner, into the initial position. On the block 162 of each vertical totalizer is fitted a plate 169, (Figs. 18, 18ª) which has at its lower end an eye, into which the pin 170 may be inserted. This pin acts as a dog for the hook 171, which is pivoted to the carriage 172 and is pressed upwards by a spring 177. As soon, now, as the vertical totalizer 4 enters into the counting column, the hook 171 is engaged by the dog pin 170 and the carriage 172, to which the connecting rod 173 is secured at its one end is moved. At its other end the rod 173 is coupled to the carriage 167, so that the cross totalizer follows the intermittent advance of the vertical totalizer towards the left until the arm 174 of hook 171 strikes against the fixed pin 175 whereby the hook is disengaged and the cross totalizer slides back under action of a spring, until the carriage 172 abuts against the fixed stop 176.

The cross totalizer must possess as many points as the vertical totalizer with the largest number of points, for example 4ᴬ. When the first point of the latter enters into the counting column, the first graduation will be opposite index 81 (Figs. 18, 18ᵃ), and the index 81ᵃ will be on the first graduation of the cross totalizer and the wheel 108 may operate the first point. When the vertical totalizer has fewer points for example, vertical totalizer 4, the cross totalizer is carried on by the difference in points before it can be operated, so that the points of the two mechanisms will always be in correct correspondence.

In case a value which has been put into the vertical totalizer for so-called vertical addition shall also be brought to the cross totalizer for cross addition, a rider 163 is inserted into the third slit in the block 162, the said rider throwing over the third lever of the set 161, before the first graduation registers with the index 81, whereby the lever 84 (Fig. 14) pushes the bar 134 to the right and withdraws the latch 136 from its notch 137, thus releasing the bar 138 which, as described, results in an adding up effect in the cross totalizer and the shifting of the indicator 158 to "A." When on the other hand, the value put into the vertical totalizer is to act subtractionally on the cross totalizer, a rider is inserted into the fouth or last slit in block 162, to operate the fourth lever of set 161, when the mechanism enters into the counting column, whereby, by means of shaft 160 and lever 177 the bar 146 is pressed down and the wheel 103 is switched for subtraction, while the indicator 158 is shifted to "S."

The four slits in block 162 and the four levers of set 161 are so arranged, that between a pair, of which the one is intended for the vertical totalizer, the other for the cross totalizer, there is a wider gap, so that a rider apiece can be inserted in the slits of each pair. The riders are made of such thickness, that two of them cannot at one time be inserted into one pair of slits for obvious reasons.

By the four possibilities of operation provided, by the riders 163 and the levers 161, two each for a vertical totalizer and the cross totalizer, a wide range of relations is given between the said totalizers. For example, it is possible—

1. To add in one vertical totalizer only.
2. To subtract when the dog pin 170 for the cross totalizer is omitted and a rider is inserted in the proper slit. Only the cross totalizer will
3. Add and
4. Subtract, when no rider for the vertical totalizer but one for the cross-totalizer is inserted into the respective slit, and the dog pin in its hole.
5. The vertical totalizer and cross totalizer will both add, or
6. Both subtract.
7. The vertical totalizer will add, the cross totalizer subtract,
8. Or vice versa, if the riders are correspondingly inserted.

Since each subsequent vertical totalizer may be separately prepared, numerous applications of the present machine are possible, particularly in combination with the cross totalizer.

When the carriage is being withdrawn to the right the levers 161 must not form any obstruction, therefore their action on the bars 39, 134 and 61 and 146 respectively, is single acting only, so that the said levers 161 may freely tilt over to the right. The slots 166 and 178 afford the levers a sufficient play for this action.

If copy is to be temporarily written on the machine without removing the vertical totalizers it will be necessary to render the riders, which will be again required for continuing the counting work, ineffective without removing them, so that, while copy is being written, on striking against the levers 161 they will not produce unnecessary operations of the same and will not change the color of the ribbon. This is obtained in the most simple manner by the two bars 61 and 146 (Figs. 13, 13ᵃ) being so arranged, that their lower end can be swung away, so that when in a straight position they will strike against the levers 63 and 148, respectively, while when swung away, as shown in dotted lines, they will not do so. This swinging away will be effected each time a key of the set of characters 1, including the figures, is depressed, by a bar 180, common to all keys, acting, immediately after such depression and before the carriage advances, on the bar 179 (Figs. 9, 10, 13, 13ᵃ and 16) which encircles the two pending arms of bars 61 and 148, and pushes them aside. The bar 180 forms with the arms 181, of which only one is shown in Fig. 16, and broken off in Fig. 10, a jointed quadrangle. To bar 180 is coupled a lever 182 through which a dog pin 183 fitted in bar 179 passes. When one of the keys of group 1 is depressed, the bar 180 will perform both a downward and a sideward movement. For transmitting this sideward movement of bar 180 by means of the lever 182, without necessitating a downward movement of bar 179, the dog pin 183 is made of a sufficient length so that it will always be guided in the slot in lever 182.

Thus, by the depression of a key, the bar 179 will be pulled to the right, whereby the subtraction couplings are cut out. In any case a change to addition can be made when the reversing gear is still standing on subtraction from a previous calculation, which is desirable, since by this operation the ribbon will present the color necessary for the copy.

The carriage begins to advance only when a key has almost reached its lowest position: since however, at this position the pending ends of the bars 61 and 146 have already moved aside, a depression of these bars during the advance of the carriage caused by a character key will remain without effect on the operation of the cam discs 25ª and 152. Since however after the depression of each character key, the bars 61 and 146 are straightened out again, the possibility of the levers 161 being operated, when the counting keys 2 are depressed, is restored again since the counting keys 2 will not affect the bar 179 and will therefore leave the bars 61 and 146 in their straightened position.

It is important also that the case shift key be as readily operated as any other. For securing this, the same sources of power and the same means are utilized as for operating and reversing the vertical totalizer. Assuming the key 2 in Fig. 7 represents this shift key, a slight pressure on it will move it into the position shown by dotted lines and allows shaft 6 to rotate in the manner described and with it a cam disc 24 provided for the shift key, so that the key lever and the reversing lever 32 assume the position shown by dot and dash lines. After the lever 32 has completed its stroke, the hook 86 pivoted to the machine body engages over pin 87 and holds the lever 32 in this position, and also the platen in its raised position, so that a capital letter or the like is printed. Immediately before the printing a type lever strikes in known manner against a bar or the like common to all type levers, which acts by means of bar 88 on the hook 86 and forces the said hook back, so that the lever 32 is again released and the platen descends to normal position. The back space key also may be operated in the same manner as the shift key and the counting keys.

The object of the modification shown in Figs. 20-24 is to return the cross totalizer which automatically follows the typewriter carriage by aid of a special spring independent of the carriage spring, into its initial position by means of an automatically acting force.

It is known that the cross totalizer, or its operating means are controlled in such a manner by the carriage of the typewriter, that the totalizer itself, or, what is practically the same, its operating wheel, is carried along by the carriage and returned by a spring. The fact, however, that the totalizer casing is temporarily carried along by the carriage contrary to the pull of a spring, leads to disadvantages, which chiefly consist in that when the totalizer springs back and is afresh carried along by the carriage, the latter is obstructed in its travel, whereby the proper sequence of the characters is impaired and errors in computing may occur.

The feature of the present modification consists therein, that the travel of the said cross totalizer is controlled in such a manner by the carriage that it will follow the travel of the carriage under the action of a spring, independent of the carriage spring, and after it has reached its last position, the units position, will be returned by an automatically acting force to its initial position.

The vertical totalizer 204 which may in known manner be fitted to the front bar of the carriage have each a hinged part 205 of the same width as the group of levers below it. An arm 206 of this part 205 bears on a pin 207 fitted in the casing of the counting mechanism, whereby the said part 205 is converted into a single acting ratchet gear. Beneath said part 205 as many double-armed levers 209 are pivoted on shaft 208, as the cross totalizer has points. At the left ends of these levers 209, beveled projections 210 are provided, which if the lengths of the said levers are suitably chosen, form gaps which correspond to the spaces of the carriage, and also to the spacing of the vertical totalizers 204 and the cross totalizer 211. Also the right ends of the levers have projections of the same pitch and lie in a straight line held by springs 212, which tend to pull the levers against the stop pin 213. The casing of the totalizer 211 is fitted to the carriage 214, which travels with balls on the carrier 215 attached to the machine body. The carriage is moved in the direction of the arrow 216 by means of a spring 217 until it abuts with its stop 218 against the projection 210ª of a lever 209. At this position the highest point of the totalizer 211 registers with the transmitter wheel 219, in which case the index 220 points to the first graduation mark on the said totalizer. If, now a vertical totalizer fitted to the carriage will have to be advanced by the difference of the points, whereby the part 205 presses down the lever 210ª and then the following one, while the corresponding levers on the right, 210ª, etc., release the stop 218, so that the cross totalizer will move two spaces to the left under the action of spring 127. Thereupon the index 220 and 220ª point to equivalent graduations, i. e., both mechanisms 204 and 211 have the same number of points. During the subsequent writing and adding the part 205 will slide over the levers 210, thereby releasing their corresponding opposite ends, whereby the cross totalizer participates in the intermittent advance of the carriage.

In order that the projections 210—210ª form no obstruction when the carriage is drawn back to the right, the parts 205 are made to yield to one side.

When, after the unit values have been received, the last lever 210 is released from the vertical and cross totalizers the roller 221 which is coupled to the carriage 214, reaches the bottom 222 of the recess in a drum cam 223, which is fitted freely revoluble on a shaft 224 driven by the motor. On this shaft the said drum cam is axially displaceable for a short distance, and the spring 225 tends to hold it constantly to the right. The clutch ring 227 fitted to drum cam 223 now engages with the clutch disc 226 rigidly fitted to shaft 224. After the clutch has been engaged as shown in Fig. 23, the drum cam 223 commences to participate in the rotation of shaft 224, in consequence whereof the cam-shaped rim of the drum forces the roller 221 and with it the carriage 214 back, contrary to the action of spring 217, until the last lever projection 210ª has engaged behind the stop 218. The totalizer 211 is now again in its initial position. As soon as the roller 221 strikes the bottom 222ª and as long as it rolls on the rim of the drum the clutch remains closed, since by means of spring 217 the spring 225 will be compressed. The disengaging of the clutch occurs only after the roller 221 leaves the drum at point 228. Only then can the spring 225 separate the clutch members 226 and 227.

Another modification is shown in Fig. 24. In place of the broad parts 205 bellcranks 230 are here employed each of which carries at its lower end a roller 231. These bell cranks likewise form a single acting ratchet gear. When passing through an operating column the roller 221 rides over the bevelled head 232 of a vertically movable bar 233 and presses the latter down according to the advance of the platen carriage, whereby the rack 234 turns the pinion 235 and therewith the shaft 236 and the cylinder 237. On the cylinder as many pins are spirally arranged as the largest vertical totalizer has points. These pins 238 are so grouped with regard to their sense of rotation that always a different pin will be opposed to the stop 239 fitted to the carriage 214, when a totalizer 204 passes into a different column. As regards their axial position they are so placed that their pitch is equal to the pitch of the points in a counting mechanism. Since also with this modification the carriage 214 and with it the entire totalizer 211 will follow the pull of a spring to the left, the stop 239 will jump from pin 238 to the next, etc., as a vertical totalizer gradually presses the bar 233 downwards.

After the last pin 238 on the left has left the stop the withdrawing device of the hereinbefore described construction comes into operation, while simultaneously the spring 240 forces the bar 233 upwards until the stop 241 bears against a fixed part of the machine body, so that the cylinder 237 again is in its initial position.

When the value transferred into a vertical totalizer 204 shall not be taken over by the cross totalizer the respective part 205 or the bellcranks 230 must be thrown over into the position 205ª or 230ª, respectively, shown by dotted lines, in which they remain in consequence of the action of a flat spring, so that they are out of operation, and the cross totalizer does not participate in the movements.

With use of the hereinbefore described means the arrangement may also be thus modified, that the cross totalizer 211 remans stationary and the driving wheel 219 is moved in the manner described.

The advantage of this arrangement over the known designs consists therein that less resistance is put to the platen carriage and that the cross totalizer will not go back under action of a spring each time it is released by a vertical totalizer leaving an operating column, but will be positively returned at a moderate speed, so that noise and wear are to a great degree dispensed with.

What I claim as my invention and desire to claim by Letters Patent is:

1. In a typewriting and calculating machine of the kind as described, a continuously rotating driving member, a driven member, a transmitting element, a key, means whereby said transmitting element is moved into a position to cooperate with said driven member on the depression of said key, and means whereby on the depression of said key said driving member is operatively connected with said driven member.

2. In a typewriting and calculating machine of the kind as described, a continuously rotating driving member, a rotatable driven member, a transmitting element, means for bringing said transmitting element into the rotational path of said driven member, and means for operatively connecting said driving and driven members whereby said transmitting element is further displaced and then positively returned to its original position under the influence of said driven member.

3. In a typewriting and calculating machine of the kind as described, a clutch comprising a rotating driving member and a driven member, a lug on said driven member at a distance from the axis thereof, a clutch control member pivoted to swing into the orbit of said lug, and a plurality of stops on said control member adapted to abut said lug singly for arresting said driven member in different angular positions, the selection of said stops depending on the angular position of said control member.

4. In a typewriting and calculating machine of the kind as described, a continuously rotating driving member, a driven member, a clutch for operatively connecting said member, a state control mechanism comprising change-initiating means, and a transmitting member controlled thereby, means whereby on one movement of said change-initiating means said transmitting member is displaced in one direction under the action of a spring, and respective means whereby on another movement of said change-initiating means said clutch is closed and said transmitting member is returned to its original position under the influence of said driven member against the action of said spring.

5. In a typewriting and calculating machine of the kind as described, a continuously rotating driving member, a driven member, a clutch for operatively connecting said member, a vertical totalizer, a cross totalizer, a state control mechanism comprising change-initiating means and a transmitting member controlled thereby, means whereby on one movement of said change-initiating means said transmitting member is displaced in one direction under the action of a spring, and respective means whereby on another movement of said change-initiating means said clutch is closed and said transmitting member is returned to its original position under the influence of said driven member against the action of said spring, an independent state control mechanism being provided for each of said totalizers.

6. In a typewriting and calculating machine of the kind as described, a plurality of actuating cams, a plurality of transmitting members, means for selectively bringing a transmitting member into the path of a cam, means for rotating the cam whereby said transmitting member is actuated, and means on the cam for positively returning said transmitting member into its non-operative position.

7. In a typewriting and calculating machine of the kind as described, a vertical totalizer, a cross totalizer, a reversing gear for each of the said totalizers, a ribbon shift and a calculation indicator and means whereby the vertical totalizer when passing into a computing column automatically sets the reversing gears, the ribbon shift and the calculation indicator in their respective positions according to the class of calculation to be made by either releasing a tension spring in the one case or engaging a continuously rotating driving member in the other case.

8. In a typewriting and computing machine a vertical totalizer and a cross totalizer, a plurality of members for initiating the change of the said totalizers from one class of calculation to the other, and a plurality of selecting members arrangeable on the said vertical totalizer, and operable on said change initiating members.

9. In a typewriting and computing machine, a vertical totalizer and a cross totalizer, a plurality of members for initiating the change of the said totalizers from one class of calculation to the other, and a plurality of selecting members arrangeable on the said vertical totalizer and operable on said change initiating members, whereby said totalizers are controllable as to state, either independently or in conjunction.

10. In a typewriting and computing machine of the kind as described a key lever consisting of two parallel bars, means whereby the said bars are coupled on a key being depressed and again uncoupled after the action of the power sets in.

11. In a typewriting and computing machine, a series of numeral keys, vertical and cross totalizers, reversing gears for the said totalizers, said reversing gears being automatically actuated in a predetermined direction upon depression of a numeral key, a series of character keys and means actuated upon depression of a character key for rendering the reversing gear inoperative.

12. In a typewriting and computing machine of the kind as described, a key lever consisting of two portions connected by a hinge joint and means whereby on the key being depressed and with it one portion of the lever, the other portion of the lever is automatically depressed through the engagement of a source of power.

13. In a typewriting and computing machine a case shift key lever consisting of two portions connected by a hinge joint, automatic means whereby on the key being depressed and with it the front portion of the lever, the rear actuating portion of the lever is in turn depressed through the engagement of a source of power, a locking member for holding the said actuating portion in its lowermost position and means whereby the said actuating portion is again released from the locking member after a writing key has been depressed.

14. In a typewriting and computing machine a travelling vertical totalizer, a travelling cross totalizer, an independent spring action for advancing the said cross totalizer, means controlled by the advance of the said vertical totalizer for allowing the said cross totalizer to advance equally under the action of the said spring and positive automatic means for returning the said cross totalizer into its initial position.

15. In a typewriting and computing machine a travelling vertical totalizer, a travelling cross totalizer, an independent spring action for propelling the said cross totalizer, a continuously rotating driving member, a driven member, means for causing the said cross totalizer to follow the said vertical totalizer under action of an indepenent spring, means for operatively connecting the said driving and driven members as the said vertical totalizer passes out of a column whereby the said cross totalizer is returned into its initial position under the action of the said driven member.

In testimony whereof I affix my signature in presence of two witnesses.

CHRISTEL HAMANN.

Witnesses:
GUSTAV BÜRGER,
FRANZ SCHMEDDING.